United States Patent
Chan et al.

(10) Patent No.: US 9,049,653 B2
(45) Date of Patent: Jun. 2, 2015

(54) HANDOVER IN CORE-EDGE SEPARATION TECHNOLOGY IN WIRELESS COMMUNICATIONS

(75) Inventors: Hinghung Anthony Chan, Plano, TX (US); Justin Zengjun Xiang, Vernon Hills, IL (US)

(73) Assignee: Futurewei Technologies, Inc., Plano, TX (US)

( * ) Notice: Subject to any disclaimer, the term of this patent is extended or adjusted under 35 U.S.C. 154(b) by 527 days.

(21) Appl. No.: 12/826,394

(22) Filed: Jun. 29, 2010

(65) Prior Publication Data
US 2011/0002301 A1 Jan. 6, 2011

Related U.S. Application Data

(60) Provisional application No. 61/222,856, filed on Jul. 2, 2009.

(51) Int. Cl.
*H04W 40/36* (2009.01)
*H04W 40/34* (2009.01)
*H04L 12/54* (2013.01)

(52) U.S. Cl.
CPC ............. *H04W 40/36* (2013.01); *H04W 40/34* (2013.01); *H04L 12/5689* (2013.01)

(58) Field of Classification Search
CPC ......... H04L 45/26; H04L 45/28; H04L 43/00; H04L 2012/5627; H04L 43/50; H04L 43/0852; H04L 43/08; H04L 12/5602; H04L 2012/5636; H04L 43/026; H04L 29/08072; H04L 29/06; H04L 29/0809; H04L 9/06047; H04L 9/08072; H04L 47/10; H04L 45/00; H04L 45/02; H04L 12/5689; H04L 45/52; H04L 61/106; H04J 3/14; H04W 24/00; H04W 80/04; H04W 8/26; H04W 36/00; H04W 40/26; H04W 40/34; H04W 40/36; H04W 40/38; H04B 17/003
USPC ......... 370/331, 218, 249, 252–253, 338, 349, 370/351, 392, 395.2, 395.31, 469, 901–902, 370/912; 709/203, 230, 235, 238, 23 S
See application file for complete search history.

(56) References Cited

U.S. PATENT DOCUMENTS 7,110,375 B2 * 9/2006 Khalil et al. .................. 370/331
7,161,929 B1 * 1/2007 O'Neill et al. ................ 370/349
(Continued)

FOREIGN PATENT DOCUMENTS

| CN | 1799241 A | 7/2006 |
| CN | 1890995 A | 1/2007 |

(Continued)

OTHER PUBLICATIONS

European Search Report received in European Application No. 10793619.7-1249, mailed Jul. 10, 2012, 8 pages.
(Continued)

*Primary Examiner* — Alpus H Hsu
*Assistant Examiner* — Dharmesh Patel
(74) *Attorney, Agent, or Firm* — Slater & Matsil, L.L.P.

(57) ABSTRACT

In one embodiment of the invention, a method for wireless communication includes receiving a packet destined to a destination node at a first egress router. The destination node is supported by a second egress router. A destination address of the packet is the first egress router. The received packet is redirected to the second egress router.

26 Claims, 10 Drawing Sheets

(56) References Cited

U.S. PATENT DOCUMENTS

| | | | |
|---|---|---|---|
| 7,840,217 B2* | 11/2010 | Patel et al. | 455/439 |
| 8,199,669 B2* | 6/2012 | Nishida et al. | 370/254 |
| 2006/0209885 A1 | 9/2006 | Hain et al. | |
| 2006/0274693 A1 | 12/2006 | Nikander et al. | |
| 2007/0076732 A1* | 4/2007 | Kim | 370/409 |
| 2007/0263553 A1* | 11/2007 | Bharali et al. | 370/254 |
| 2008/0181216 A1* | 7/2008 | Breau et al. | 370/389 |
| 2008/0253329 A1 | 10/2008 | Asou | |
| 2009/0201834 A1 | 8/2009 | Xu | |

FOREIGN PATENT DOCUMENTS

| | | |
|---|---|---|
| CN | 101350807 A | 1/2009 |
| CN | 101427526 A | 5/2009 |
| WO | WO 2007/071112 A1 | 6/2007 |
| WO | WO 2008/088271 A1 | 7/2008 |
| WO | WO 2008/098522 A1 | 8/2008 |

OTHER PUBLICATIONS

International Search Report and Written Opinion of the INternational Searching Authority received in Patent Cooperation Treaty Application No. PCT/CN2010/074906, mailed Oct. 21, 2010, 11 pages.

Chinese Office Action received in Application No. 201080013056.0, Applicant: Huawei Technologies Co., Ltd., mailed May 21, 2013, 11 pages.

* cited by examiner

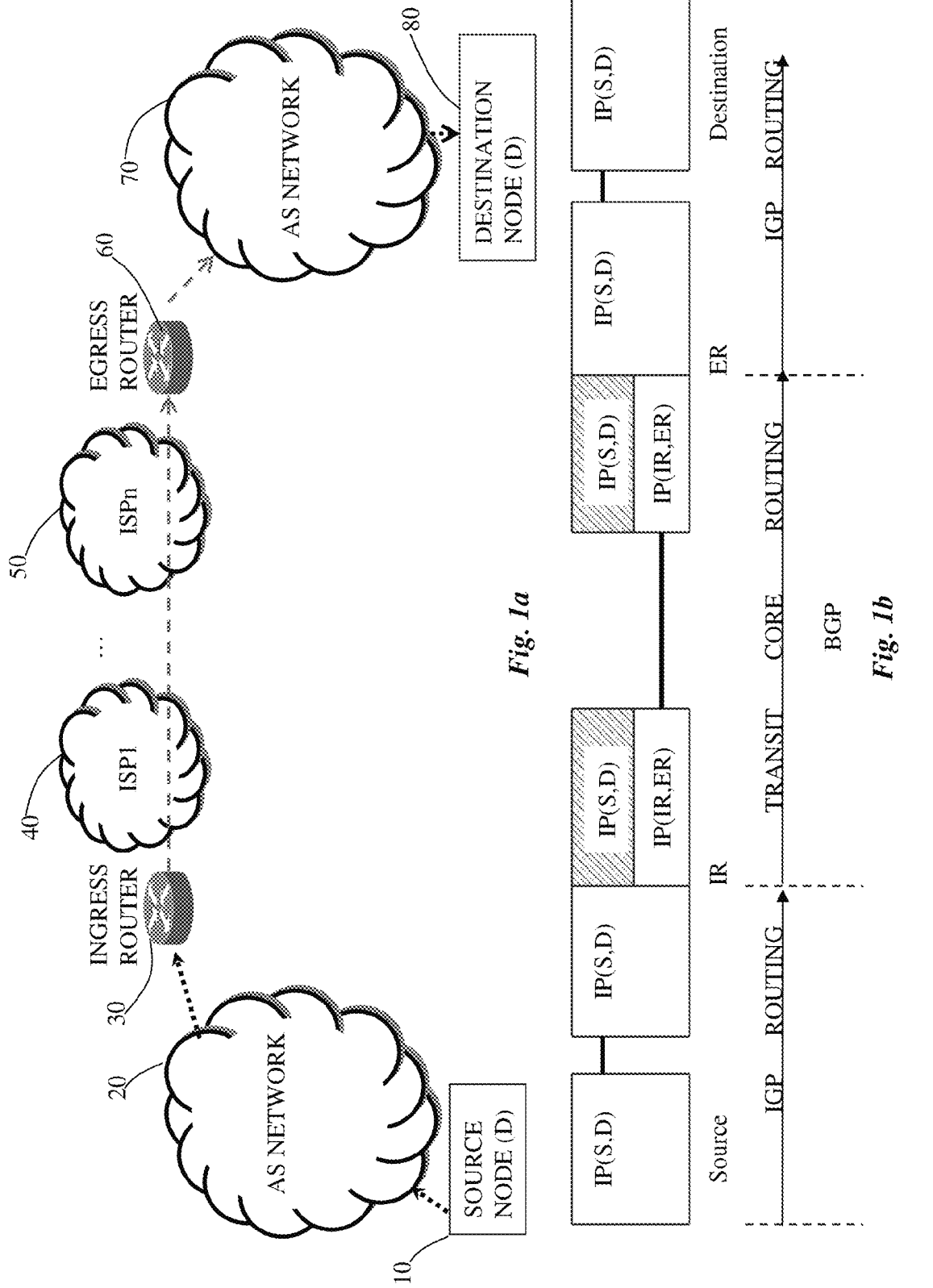

| DATABASE | MAPPING BETWEEN | LOCATION OF DATABASE |
|---|---|---|
| ER MAPPING DATABASE | IP(D) and IP(ER) | LMA |
| MAG MAPPING DATABASE | IP(D) and IP(MAG) | ER |
| IP(D) | IP(D) | MAG |

*Fig. 2b*

| STEP | OPERATION | MAPPING BETWEEN | LOCATION OF MAPPING UPDATE |
|---|---|---|---|
| 1 | ADD | IP(D) and IP(NER) | NEW ER (NER) |
| 2a | DELETE | IP(D) and IP(PER) | PREVIOUS ER (PER) |
| 2b | ADD | IP(D) and IP(NER) | COMMUNICATING IR's |
| 2c | ADD | IP(D) and IP(NER) | PER |
| 3 | ADD | IP(D) and IP(NER) | LMA / HA / MAPPING DATABASE |

*Fig. 5*

HANDOVER IN CORE-EDGE SEPARATION TECHNOLOGY IN WIRELESS COMMUNICATIONS

This application claims the benefit of U.S. Provisional Application No. 61/222,856, filed on Jul. 2, 2009, entitled "Handover in Core-Edge-Separation Technology in Wireless Communications," which application is hereby incorporated herein by reference.

TECHNICAL FIELD

The present invention relates generally to wireless communications, and more particularly to handover in core-edge separation technology in wireless communications.

BACKGROUND

The drive for wireless communications is to allow for greater levels of roaming and allow seamless roaming. Myriad issues, such as hand-off between providers, authentication, communication system capabilities and limitations, become increasingly important when roaming, particularly when global roaming is contemplated.

When a mobile node moves from an area covered by one network and enters another area covered by another network the call must be transferred to the second network without dropping the connection or loosing packets. This function can be referred to as handover with fast mobility. Similarly, when a mobile node is powered on in a new location served by a different network than the immediately preceding network used by the mobile node, the wireless communications network must recognize the change in location of the mobile node and direct to the new network the information destined to the mobile node. This can be referred to as handover with slow mobility. Wireless communications networks must support such slow-mobility roaming and fast-mobility handoff or handover to enable seamless mobility of mobile devices.

SUMMARY OF THE INVENTION

In accordance with an embodiment of the present invention, a method for wireless communication comprises receiving a packet destined to a destination node at a first egress router. The destination node is supported by a second egress router. A destination address of the packet is the first egress router. The received packet is redirected to the second egress router.

In another embodiment of the present invention, a method for wireless communication comprises adding a mapping between an IP address of a destination node and an IP address of a new egress router at a central mapping database. A mapping between the IP address of the destination node and an IP address of a previous egress router is deleted at the central mapping database. The method further comprises routing a packet destined to the destination node to the second egress router using the central mapping database.

In yet another embodiment of the present invention, a method for wireless communication comprises routing a first packet destined to a destination node to a first egress router at an ingress router. A second packet destined to the destination node to a second egress router is routed at the ingress router.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 1, which includes FIGS. 1a and 1b, illustrates mapping and encapsulation for nodes belonging to a site using provider independent IP prefix, wherein FIG. 1a illustrates a network and FIG. 1b illustrates a portion of the IP header fields: the source and destination IP addresses, in the network layer of a packet transmitted through the network;

FIG. 2, which includes FIGS. 2a and 2b, illustrates a network based mobility for core-edge separation in accordance with an embodiment of the invention, wherein FIG. 2a illustrates the network, and wherein FIG. 2b illustrates a location of the mapping databases within the network;

FIG. 3, which includes FIGS. 3a and 3b, illustrates packet routing through a network in accordance with an embodiment of the invention, wherein FIG. 3a illustrates the data path and FIG. 3b illustrates the source and destination IP addresses of the IP header in the network layer of a packet while being routed through the network;

FIG. 5 illustrates the steps performed to enable both slow and fast mobility in accordance with embodiments of the invention;

FIG. 6, which includes FIGS. 6a and 6b, illustrates a fast handoff embodiment of the invention, wherein FIG. 6a illustrates the handoff of a mobile station from one edge/access network to another, and FIG. 6b illustrates the modification to the source and destination addresses of the IP packet header of a packet sent from a correspondent node during the handoff;

FIG. 7, which includes FIGS. 7a and 7b, illustrates an embodiment of the invention using translation protocol, wherein FIG. 7a is a representation of the packet transmission in the core-edge separation under normal situations, which are not immediately after the handoff of a MS, and wherein FIG. 7b is a representation of the packet transmission in the core-edge separation immediately after the MS has moved to a new egress router.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 2A:
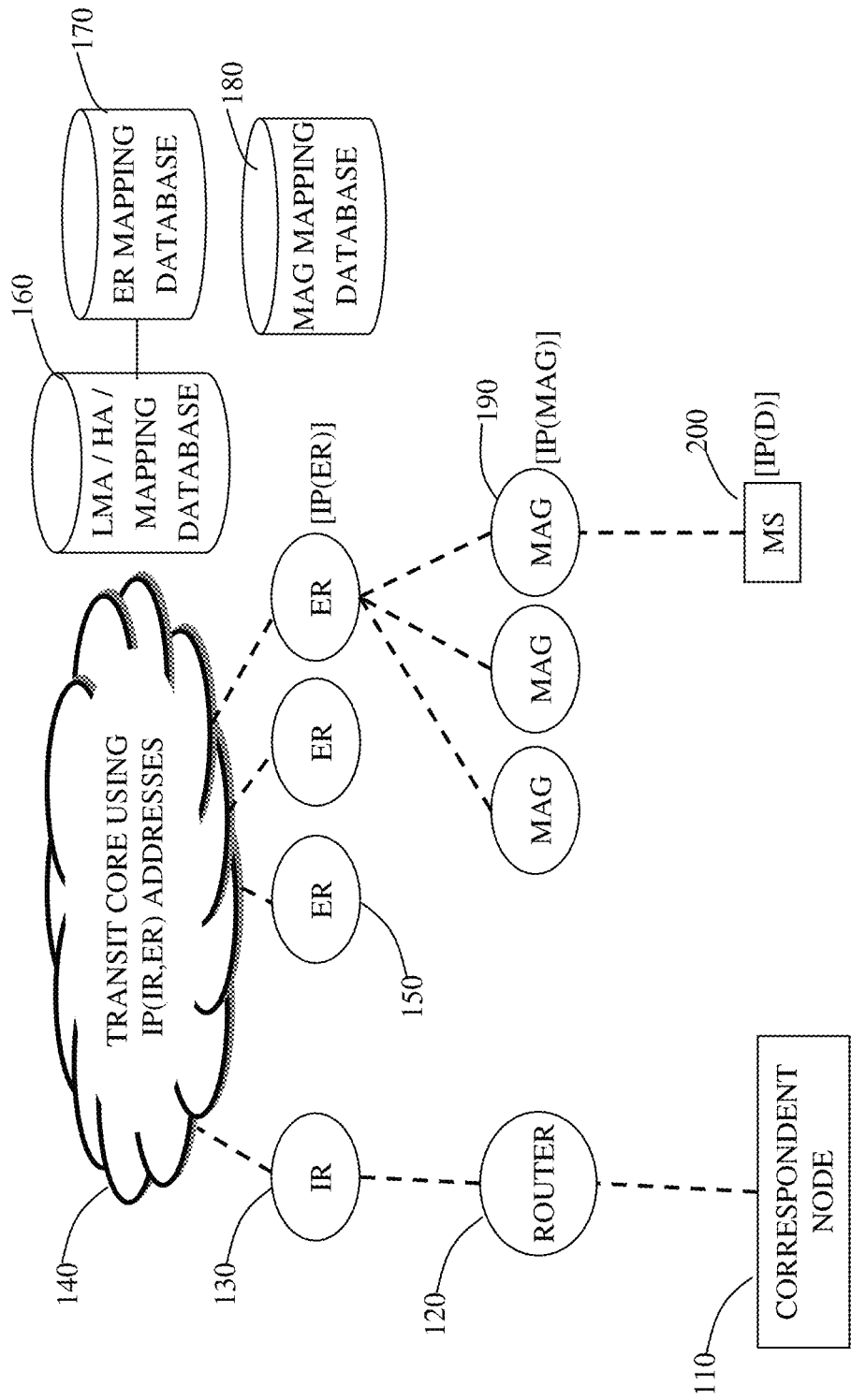

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Provider-independent (PI) IP addresses and multi-homing are increasingly used in the internet. In provider-independent (PI) IP addresses the same IP address is used for routing in both edge network and core transit network. However, this has resulted in the need to advertise more and more PI addresses in the global routing system. This problem is called the routing scalability problem.

The routing scalability problem excessively increases the cost of internet routing and affects the speed of routing. Numerous proposals have been made since 2006 to solve the routing scalability problem without changing the existing IP protocol stack in the end host. These solutions predominantly are based on using separate routing address spaces in the edge network and the transit core network.

Core-edge protocols are a family of numerous routing protocols to work in core-edge separation network, which is a network-based ID-location split technology using new routing protocols that are different from that of the current internet. These protocols have been designed to solve the routing scalability problem, to support site multi-homing, and to enable more efficient traffic engineering.

Proxy mobile IP (PMIP) is a network-based mobility management protocol for the network to perform mobility management signaling on behalf of a mobile node so that the mobile node may continue to use its home IP address to move and to handoff from one network to another. Both core-edge separation protocol and proxy mobile IP (PMIP) have the advantage of being network-based so that the client nodes do not need to make changes, but the solutions they offer are different from each other and they operate on different routing design that they may be incompatible with each other. In various embodiments, this invention makes changes to the core-edge separation and PMIP design to enable core-edge separation protocols to support mobility management including handoff.

When using core-edge separation, the hosts in the edge network may use provider-independent IP addresses, which are globally unique and are used for routing in the edge network. Here, the source IP address in the IP packet header is the PI address of the sender, whereas the destination IP address is the PI address of the receiver.

Routing in the core-transit network uses provider-aggregatable (PA) IP addresses, which are aggregated in a routing table so that the routing here is scalable. Here, the source IP address in the IP packet header is the PA address of the router where the IP packet enters the core network, whereas the destination IP address is the PA address of the router where the IP packet will exit the core to enter the edge network that will be able to deliver the packet to the destination host.

When using core-edge separation, a new function is needed at the boundary between core and edge network to enable the conversion of packets crossing the core-edge boundary. On entering the core transit network from the edge network, the ingress router will map the destination (PI) address to the (PA) address of the egress router at which the packet will egress to the edge network of the destination host. The ingress router converts the packet with a new header to route from the PA address of the ingress router to the PA address of the egress router. On leaving the core transit network to the destination edge network, the egress router converts the packet back to the original header of source PI address of the sending host and destination PI address of the receiving host in the edge network.

FIG. 1, which includes FIGS. 1a and 1b, illustrates mapping and encapsulation for nodes in a AS network using provider independent IP prefix, wherein FIG. 1a illustrates a network and FIG. 1b illustrates a portion of the IP header fields: the source and destination IP addresses, in the network layer routing packets transmitted through the network.

Referring to FIG. 1a, the network comprises many Autonomous Systems (AS) networks. Each AS may run its own Interior Gateway Protocol (IGP) to route packets within its network. These AS's are interconnected and packets traversing across these AS networks are routed using a different routing protocol suitable for the transit core network such as a Border Gateway Protocol (BGP). The core-AS separation refers to the separation of AS running its own IGP and the transit core running BGP.

Referring to FIG. 1a, a packet originating from a source node (S) 10 transits through the AS network of the source node 20 using Interior Gateway Protocol (IGP). The packet enters the transit core through the ingress router 30 and tunneled from the ingress router 30 to an egress router 60 through a plurality of service providers such as ISP1, ISP2, . . . , ISPn. The egress router 60 routes the packet through the destination AS network (AS network of the destination node) 70 to the mobile destination node (D) 80.

Packets from the AS network enter the transit core network at the ingress router (IR) 30 and leave the transit core at an egress router (ER) 60. This is achieved by having at least two types of IP addresses: a provider independent IP address such as IP(D), which is the IP address of the destination node and a provided aggregatable IP address such as IP(ER), which is the IP address of the egress router at the border between the core and the destination AS network.

As illustrated in FIG. 1b, each AS network may use its own IGP to route packets with the IP addresses of the source and destination nodes (IP(S, D)). Therefore, the IP header of a packet sent from a source end host or source node (S) 10 to a destination end host or destination node (D) 80 uses the IP addresses of S and D when the packet is within the source AS network 20 and the destination AS network 70.

The transit core uses BGP to route packets with IP addresses of the ingress and the egress routers 30 and 60 (IP(IR, ER)). Routers in the transit core do not need to be aware of the destination node. The transit core only requires the IP of the egress router serving the AS of the destination node. Therefore, when the packet being transmitted reaches the transit core, the IP header of this packet must indicate IP(IR, ER). Accordingly, the ingress router 30 converts (or encapsulate with an outer IP header) the IP header, and the egress router 60 performs the reverse conversion (or decapsulation).

Therefore, at the ingress router 30, the IP address of the destination node (D) is mapped to the ER at the AS in which D is located, which is the egress router 60 in FIG. 1a. To perform the mapping, the ingress router 30 must know the mapping data of the IP address of the destination host IP(D) with the IP address of the egress router, IP(ER). The ingress router 30 then encapsulates the IP header with another IP header, which includes the addresses of ingress router 30 and the egress router 60 i.e. IP(IR) and IP(ER).

The egress router 60 de-encapsulates the outer IP header to restore the original IP packet having the original header directed to the original destination node i.e. IP address of the destination node IP(D). The IP packet having the original header IP(S, D) is directed within the AS of the destination node 70. This destination AS network 70 may use its own IGP to route the packet to the destination node 80 using the IP addresses of the source and destination node (IP(S, D)). The type of routing described above is also referred as map-and-encap technology.

A network having core-edge network separation will now be described for network based mobility in accordance with an embodiment of the invention.

FIG. 2, which includes FIGS. 2a and 2b, network based mobility for core-edge separation in accordance with an embodiment of the invention, wherein FIG. 2a illustrates the network, and wherein FIG. 2b illustrates a location of the mapping within the network.

Referring to FIG. 2a, a correspondent node 110 (or source node) attaching to an AS network through an access router 120 is connected to the transit core network 140 through the Autonomous Systems (AS) network and enters the transit core network 140 through an ingress router 130. The correspondent node 110 may not be aware of the location of the destination node in the network. The nodes within a home AS network may use provider independent (PI) addresses to route within the home AS network, whereas the transit core network 140 may use provider aggregatable (PA) addresses to route from any ingress router 130 to a particular egress router 150.

The transit core network 140 is coupled to a plurality of egress routers (ER) 150 each egress router having an unique IP address (IP(ER)). Each egress router serves a plurality of mobile access gateway (MAG) 190. Each MAG of the plurality of MAG 190 has an unique IP address (IP(MAG)). A plurality of mobile stations 200 are connected to each MAG. The IP address of the destination mobile station is IP(D).

In various embodiments, the MAG performs mobility signaling on behalf of a mobile station (MS) 200 to enable the mobile node to continue to use its home address (HoA) when it moves within the AS. Each MAG of the plurality of MAG 190 has an unique IP address (IP(MAG)), which is the proxy care-of-address for the mobile station 200.

Embodiments of the invention extend the functionality of the egress router (ER) 150 of an AS to keep track of the home IP address of all the mobile stations within a particular AS in addition to the IP prefixes of all the sites within the AS. In particular, the ER 150 knows how to route a packet destined to any node inside the AS. If the destination node is a mobile station 200 served by a MAG, the ER 150 tunnels the packet to the MAG 190, which delivers the packet to the mobile station 200.

In various embodiments, the invention modifies the mechanism of proxy mobile IP to enable more efficient mobility management in the core-edge separation network routing system. Embodiments of the invention achieve this by using a mapping hierarchy.

A local mobility anchor/home agent (LMA/HA) mapping database 160 is at the top of the mobility anchor hierarchy. The LMA/HA mapping database 160 keeps mapping information to select an ER 150 for the AS in which the destination node is located in. Hence, the LMA/HA maps each destination node's IP address (IP(D)) to the IP address of the ER 150 (IP(ER)). This mapping information may be part of the LMA/HA mapping database 160 of the network or a separate ER Mapping database 170 that communicates with the LMA/HA.

Once this mapping is established, a change in mapping is only needed when the mobile node moves from one AS to another. The mobile station 200 may move and change its MAG 190. As long as the MS 200 is within the same AS, the transit core network 140 continues to forward packets destined to the MS 200 to the ER 150 of the AS.

The egress router 150 serves as an intermediate mobility anchor for all the mobile nodes inside the AS. In other words, the ER 150 (each ER of the plurality of ERs) keeps a MAG mapping database. MAG mapping database 180 is a database comprising mapping information of the IP address of the end node (IP(D)) to the proxy care-of-address of the MAG 200 (IP(MAG)). At the egress router 150, a MAG mapping database 180 maps the packet to the IP(MAG) such that the packet is directed to the MAG 190 serving the mobile station 200 (destination node). At the MAG 190, the packet routed to the mobile station 200.

Figure 3A:
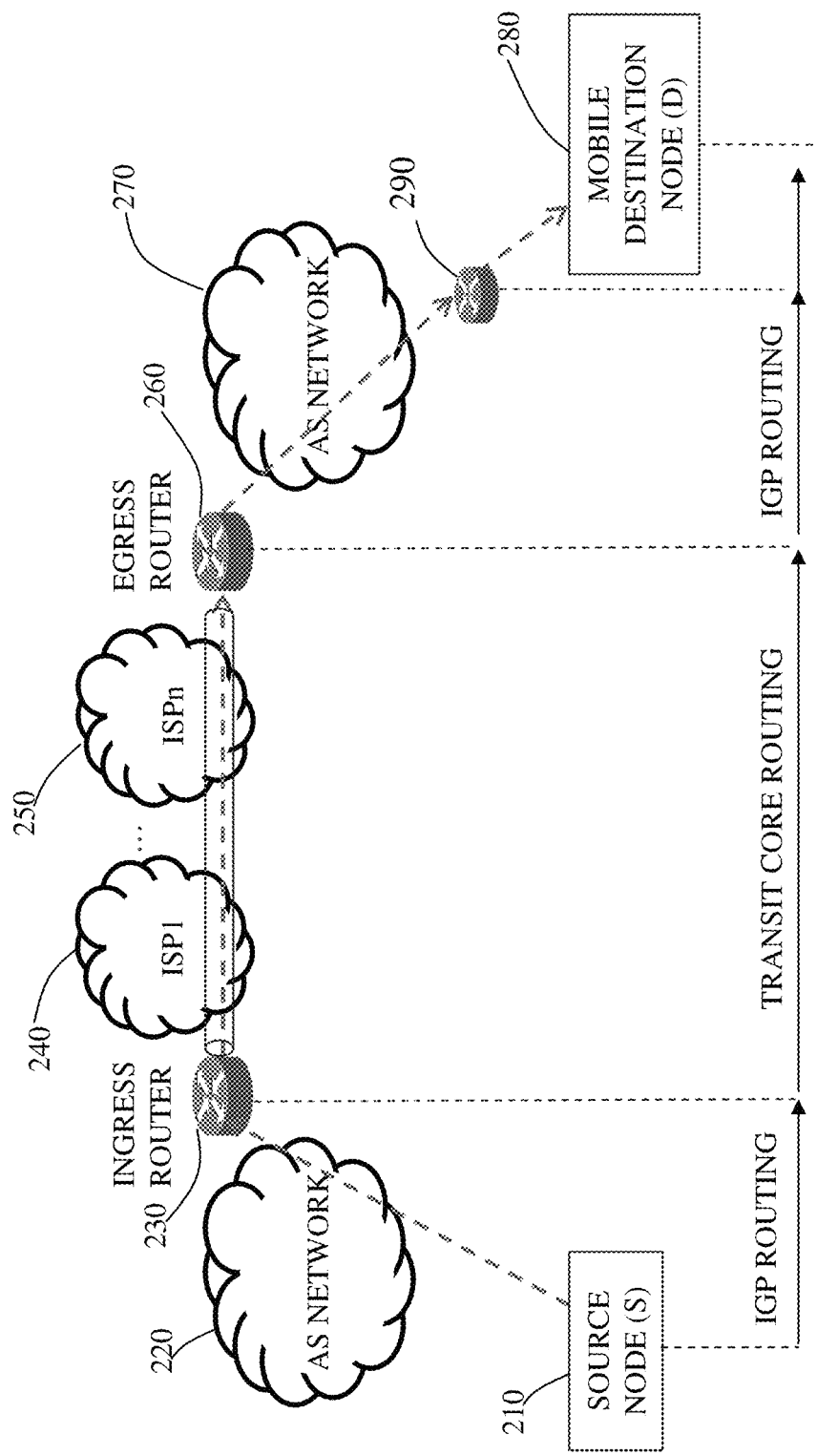
Figure 3B:
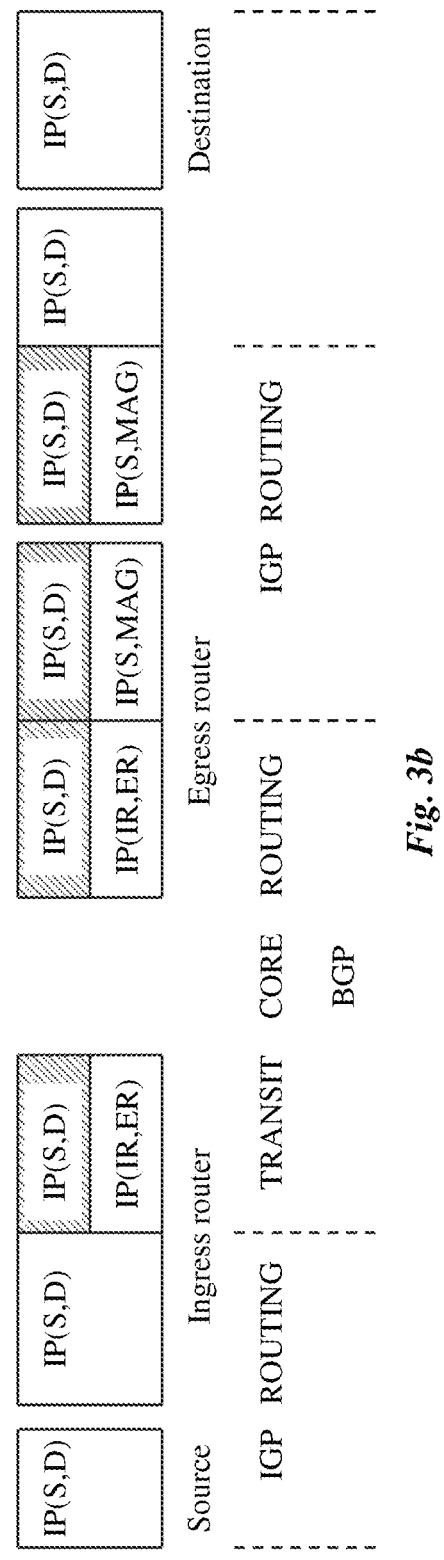

FIG. 3, which includes FIGS. 3a and 3b, illustrates routing a packet through a network in accordance with an embodiment of the invention, wherein FIG. 3a illustrates the data path and FIG. 3b illustrates a network layer of the packet while being routed through the network.

Referring to FIG. 3a, a packet originating from a source node (S) 210 transits through the AS network of the source node 220 using Interior Gateway Protocol (IGP). The packet enters the transit core through the ingress router 230 and tunneled from the ingress router 230 to an egress router 260 through a plurality of service providers such as ISP1, ISP2, . . . , ISPn. The egress router 260 routes the packet through the destination AS network 270 to a mobile access gateway MAG 290. The MAG 290 routes the packet to the mobile destination node (D) 280.

Referring to FIG. 3b, the packet header at the source node 210 indicates the IP address of the addresses of the source and destination node (IP(S, D)). If the destination node D is within the AS, the packet is transported within the AS network. However, if the destination node is outside the AS network of the source node 220, as illustrated in FIG. 3a, the packet is routed to an ingress router 230. Neither the AS network of the source node 220 nor the ingress router 230 may be aware of the location of the destination node 280. Therefore, the ingress router 230 may request the LMA/HA to indicate the IP address of the egress router for the provided destination node. At the ingress router, based on the output from the LMA/HA, which may use information from an ER mapping database (e.g., as described above), the ingress router encapsulates the packet header and adds a new header routing the packet to the egress router of the AS network of the destination node. The packet having the IP addresses of the ingress and the egress routers (IP(IR, ER)) is routed through a tunnel through the transit core using border gateway protocol (BGP).

At the egress router, the packet is de-encapsulated and re-encapsulated. Using a MAG mapping database, the packet header is changed to indicate the IP address of the source node and the MAG node (IP(S, MAG)). The packet is thus routed through the AS network of the destination node 270 to the MAG 290 serving the destination node 280. At the MAG 290, the packet is de-encapsulated, and the original packet header is extracted and routed to the destination node 280.

Embodiments of the invention thereby enable reachability or mobility of mobile stations. When a mobile station moves and changes its MAG within an AS network there is no change in ER. The ER, being an intermediate mobility anchor point within the AS network, knows the new MAG serving the mobile station and routes the packets accordingly. Alternatively, when the mobile station moves from one AS network to another AS network thereby changing its egress router, the ER mapping database (or LMA/HA mapping database) at the top of the mobility anchor point, knows the new ER associated with the new AS network. Thereby packets being sent to the mobile station are directed correctly. Thus the IR correctly routes the packet through the transit core network even if the mobile station changes the AS.

In various embodiments, the invention enables seamless handoff of a mobile destination node as it moves through the network, which may require a change of the egress router. In various embodiments, the AS networks served by the egress routers may be of the same technology or of different network technologies, and it is necessary to meet the requirements of fast mobility in the handoff.

Figure 4:
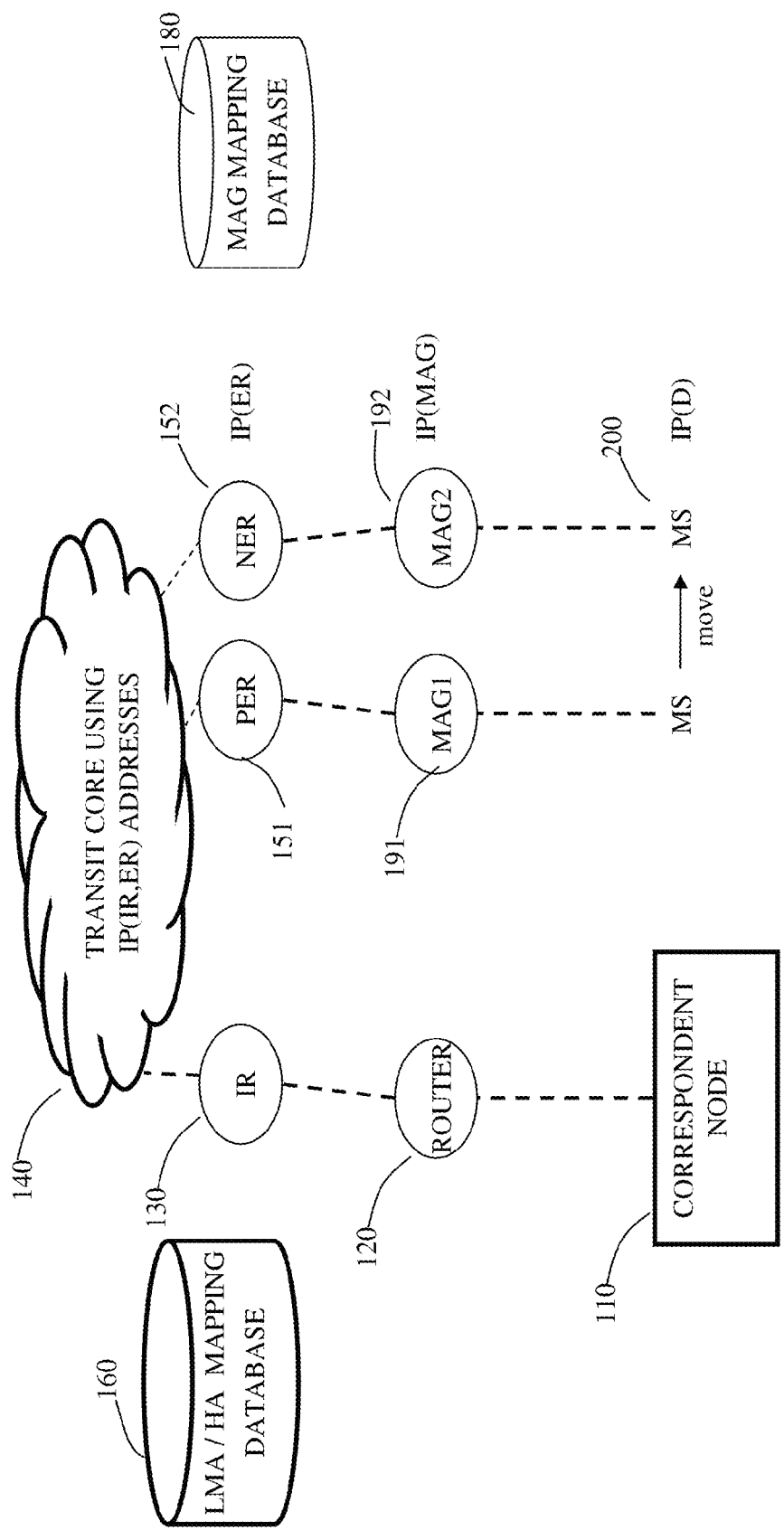
FIG. 4 illustrates an embodiment of the invention enabling fast and slow mobility handoff.

FIG. 4 illustrates an embodiment of the invention enabling both fast and slow mobility.

The network illustrated in FIG. 4 is similar to that shown in FIG. 3, however the mobile station 200 moves from an AS to another AS thereby requiring a change in egress router. The mobility of the MS 200 requires a handoff from a network served by the previous egress router (PER) 151 to the network served by the new egress router (NER) 152. The PER 151 is serving MAG1 191 which in turn serves the MS 200 before handoff while the NER 152 is serving MAG2 192 which in turn serves the MS 200 after handoff. Embodiments of this invention enable handoff of MS 200 by changing the MS's IP address anchor point from a previous egress router 151 to a new egress router 152, thereby meeting the requirements of fast handoff. The handoff is accomplished when a packet destined to the MS 200, and arriving at the PER 151 is re-directed to the NER 152.

An embodiment of the invention for supporting slow mobility is first described. Slow mobility relates to a mobility of the mobile station over a long period of time. For example, a mobile station may be powered off, transported to a new geographic location, and powered on at the new geographic location. Before the MS 200 moved, the MS 200 is reachable in an AS network through its egress router i.e. PER 151.

As described previously above, slow mobility is accomplished by the mobility anchor hierarchy. The mobility anchor hierarchy comprises a hierarchy of mapping databases in various embodiments. In various embodiments, the handoff may be accommodated using many different mapping systems between the destination IP address, IP(D), and the IP address of the egress router, IP(ER). Each ER knows the IP addresses of all the nodes it is serving. The collection of all these information from all the egress routers in the entire internet is the full mapping information. This mapping information may be in (very large) centralized full mapping systems, distributed mapping systems, or a combination of these e.g. as part of the LMA/HA mapping database 160 or a separate ER mapping databases 170. Each IR may obtain this information through push, pull, or a combination of these. In various embodiments, this mapping information of which IP address belongs to which ER is at the ER and may be propagated to the LMA/HA mapping database 160. Therefore, the IR may query the LMA/HA mapping database 160 and obtain the mapping for the IP address of the destination node. In various embodiments, by querying for the mapping information between the egress router and the destination node, advantageously each ingress router in the network does not require to keep track of all the destination nodes. Rather, only the central database such as the LMA/HA mapping database 160 maintains this database.

FIG. 5 illustrates the steps performed to enable both slow and fast mobility in accordance with embodiments of the invention.

Referring to FIG. 5, when a destination node, such as a MS 200, changes its attachment from its previous egress router 151 to a new egress router 152, the new egress route 152 modifies its routing information to add the PI address of the destination node, IP(D) (STEP 1 in FIG. 5), whereas the previous egress router 151 deletes this IP address in its routing information (STEP 2a in FIG. 5). The mapping system will begin its update to include the change in this mapping (STEP 3). If the mapping system uses a centralized global mapping system, such as the LMA/HA mapping database 160, the update may not begin immediately. Even after the update is initiated, considerable time may elapse before the update is completed. It will also be a slow process for all the ingress routers (IR's) to receive this mapping update. Once the LMA/HA mapping database 160 finishes the update, ingress routers requesting the IP address of the egress router for a new user or session will receive the correct IP address of the NER.

Slow mobility is thereby supported by updating the mapping database e.g., LMA/HA mapping database 160 as the mobile station changes its egress router. Hence, when a new packet destined to the MS 200 reaches the ingress router 130, the updated LMA/HA mapping database 160 directs the packet to new egress router 152 rather than the previous ingress router 151. However, this mechanism only supports slow mobility because long delays are expected to update the LMA/HA mapping database 160, and for the ingress router 130 to obtain or be notified about this updated mapping information. Such long delays are too slow to support mobility for ongoing sessions. Further, ingress routers may not request the LMA/HA mapping database after the session is initiated. For example, the ingress router may store the mapping information in its memory cache with a timeout and request the LMA/HA mapping database again only after the timeout is reached.

Embodiments of the invention also enable fast mobility such that packets being transmitted during an ongoing session are seamlessly redirected to a new egress router and thereby reach a mobile station moving from one AS network to another AS network. Hence, packets destined to a destination IP address are redirected from a previous egress router 151 to the new egress router 152.

In various embodiments, the mapping information is changed for both the previous egress router 151 and those ingress routers that are actively sending packets to the destination node, such as ingress router 130. In other words, as illustrated in STEP 2b (FIG. 5), under the fast mobility embodiment, a mapping update is immediately sent to all ingress routers 130 that are actively sending packets to the destination node (MS 200), so that these communicating ingress routers 130 will use the new mapping to reach the destination node through the new egress router 152.

Even if all the relevant ingress routers are notified of the mapping update, the handoff delay may still be not fast enough because the ingress routers can be located anywhere in the world. Hence, many packets may be transmitted to the previous egress router 151 before a mapping update reaches some of the ingress router 130. Packets sent to the previous egress router 151 may be dropped because the destination address of the MS 200 is no longer served by the previous egress router 151. Therefore, in one or more embodiments, a mapping update is sent to the previous egress router 151.

In various embodiments, as illustrated in STEP 2a, the PER 151 is directed to delete the mapping between the IP address of the destination node IP(D) and the IP address of the previous egress router 151 IP(PER). In addition, as illustrated in STEP 2c, the PER 151 is directed to add the mapping between the IP address of the destination node IP(D) and the IP address of the new egress router 152 IP(NER). In various embodiments, this update to the PER 151 may be sent either from the new egress router (NER) or the destination node (D), such as MS 200, may send this mapping change to the previous egress router (PER). Alternatively, the MAG2 192 serving the MS 200 may send the update to the PER 151 in some embodiments. Further, in some embodiments, the directive may be initiated by the PER itself. This is because the PER is aware that it was serving the MS 200 even though currently the PER is not serving the MS. Hence, the PER may as an example use a flag in a reserved field in the existing message protocol header. The PER may use this reserved field to identify that a update in the IP header of the incoming packet is necessary.

Because the destination node of the MS 200 has been previously attached to the previous egress router 151, the previous egress router 151 is likely not geographically too far away. Therefore, the mapping update can reach the previous egress router (PER) quite fast.

In various embodiments, after the mapping update, the previous egress router 151 forwards packets destined to the MS 200 to the new egress router 152. Therefore, the previous egress router 151 may still receive packets destined to the MS 200 from other ingress routers 130 (from anywhere in the world) that are still using the old mapping database. However, because of the mapping update at the previous egress router 151, the previous egress router 151 redirects these misdirected packets to the new egress router 152.

In one embodiment of this invention, the mapping update sent to the previous egress router 151 resides in the mapping cache of the previous egress router 151. A new mapping entry is added to the mapping cache of the prior egress router 151 to map the IP address of the destination node, IP(D) to the IP address of the new egress router 152, IP(NER). The previous egress router 151 will then promptly use this new mapping to re-direct the packet to the new egress router 152.

The re-direct methods described in embodiments of the invention work irrespective of the particular core-edge separation technology. It uses as much as possible of the core-AS separation technology to minimize the amount of needed new functions.

In one embodiment of the re-direct method, if the adopted core-AS separation technology uses tunneling to convert the packets crossing the core-AS boundary, the re-direct method will use the same rules of the operating core-AS separation technology to either tunnel again (tunnel in tunnel) or replace the header of the outer tunnel in order to redirect to the new egress router (NER).

In various embodiments, if the core-AS separation technology uses tunneling to convert the packets crossing the core-AS boundary, the re-direct method will use the same rules of the operating core-AS separation technology to either tunnel again (tunnel in tunnel) or replace the packet header of the outer tunnel in order to redirect the packet to the new egress router (NER). Alternatively, if the core-AS separation network technology changes the IP header to convert the packets crossing the core-AS boundary, the re-direct method will use the same rules of the operating core-AS separation technology to replace the outer header of the tunnel in order to redirect the packet to the new egress router. Hence, in various embodiments, the redirect method from the previous egress router to the new egress router may be performed by replacing the outer IP packet header with the IP address of the new egress router using map-and-encap technology or IP header translation/replacement technology.

These embodiments are described below with respect to FIGS. 6 and 7.

Figure 6A:
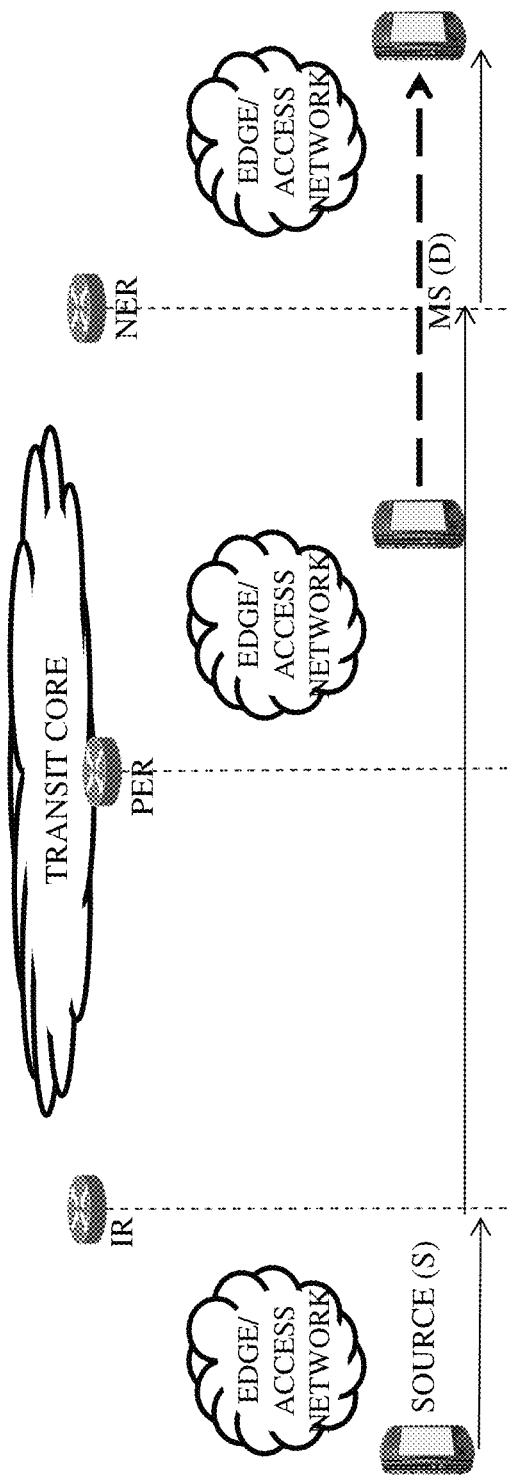
Figure 6B:
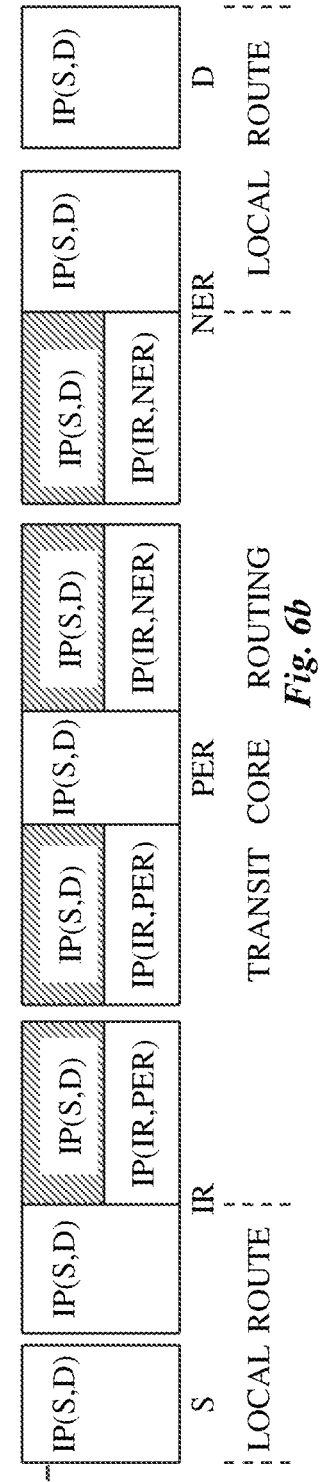

FIG. 6, which includes FIGS. 6a and 6b, illustrates a fast handoff embodiment of the invention, wherein FIG. 6a illustrates a packet being transferred during the handoff and FIG. 6b illustrates the corresponding modification of the packet header during the transmission using map-and-encap technology.

Before the MS 200 moves to the new location in another access network, a packet destined to the MS 200 is transmitted using the routing shown in FIG. 1 having the network layer represented by FIG. 1b. While the packet is actually tunneled from ER to MAG before being delivered to D (as described in FIG. 3), this step is not discussed here for simplicity.

After the MS 200 moves to the new location in another access network (illustrated by dashed line in FIG. 6a), a packet destined to the MS 200 is transmitted using the routing shown in FIG. 6b using a map-and-encap technology. As illustrated in FIG. 6b, the packet destined to the MS 200 is received at the previous egress router 151.

The packet's outer tunnel header is changed at the previous egress router 151 based on the mapping update so that the new header indicates the location of the new egress router 152. The packet is then tunneled through the transit core network 140 to the new egress router 152. At the new egress router 152, the packet header is changed to route to the MS 200, e.g., through a MAG serving the MS 200.

Figure 7A:
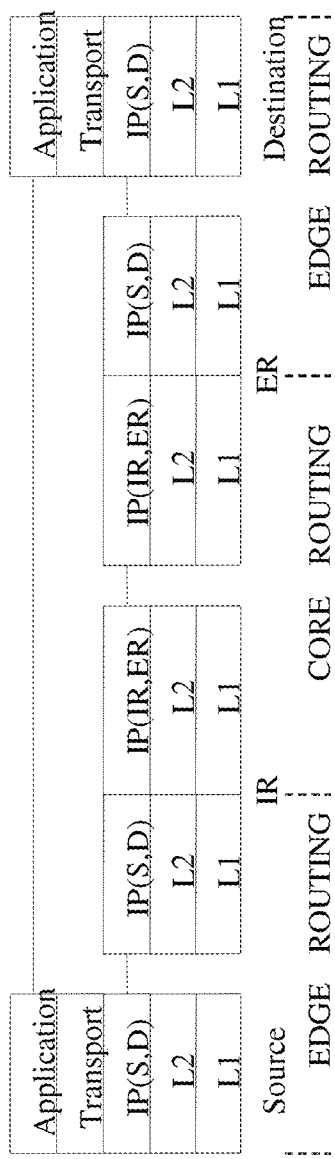
Figure 7B:
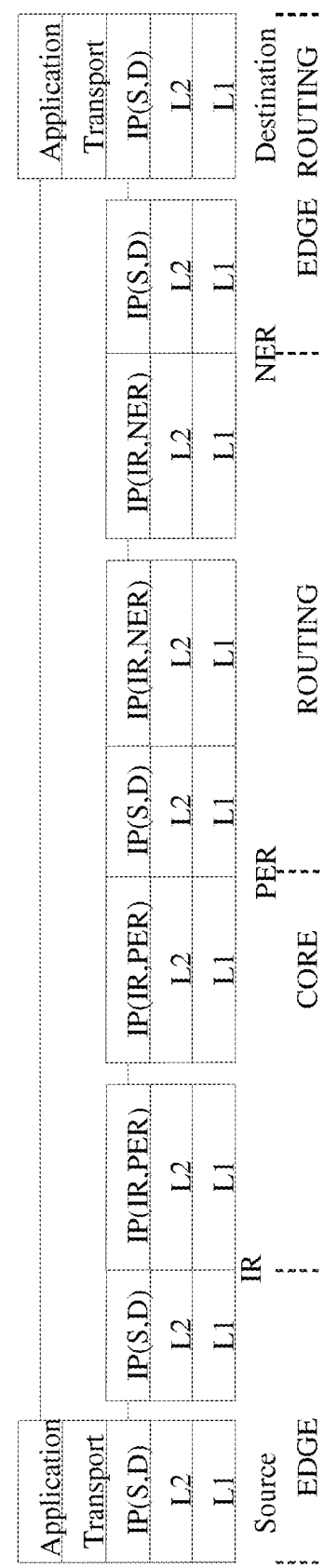

FIG. 7, which includes FIGS. 7a and 7b, illustrates an embodiment of the invention using translation protocol, wherein FIG. 7a is a representation of the packet transmission in the core-edge separation under normal situations, which are not immediately after the handoff of a the MS, and wherein FIG. 7b is a representation of the packet transmission in the core-edge separation immediately after the MS has moves moved to a new egress router.

The IP header information before a MS changes its egress router is shown in FIG. 7a. After the MS changes its egress router, the new IP header information is shown in FIG. 7b, which illustrates the change in header at the previous egress router.

FIG. 7a illustrates the network layer having the IP headers disposed below the application, transport layers and above the link layers. The IP header routing is similar to the described with respect to FIG. 1a. However, in a translation protocol, the source and destination address are rewritten with the IP address of the ingress and egress routers (IP(IR, ER)). Further, there is no encapsulation and the packets with translated addresses are forwarded across the core, for example, by ordinary BGP routers. At the egress router, the IP headers are rewritten again and replaced with the source and destination addresses (IP(S, D)).

FIG. 7b illustrates replacing the IP header of a packet at a previous egress router to re-direct the packet to a new egress router using a core-AS separation translation protocol. The core-AS separation network technology changes the IP header to convert the packets crossing the core-AS boundary. In one or more embodiments, the re-direct method replaces the header of the outer tunnel in order to redirect the packet to the new egress router.

Figure 8:
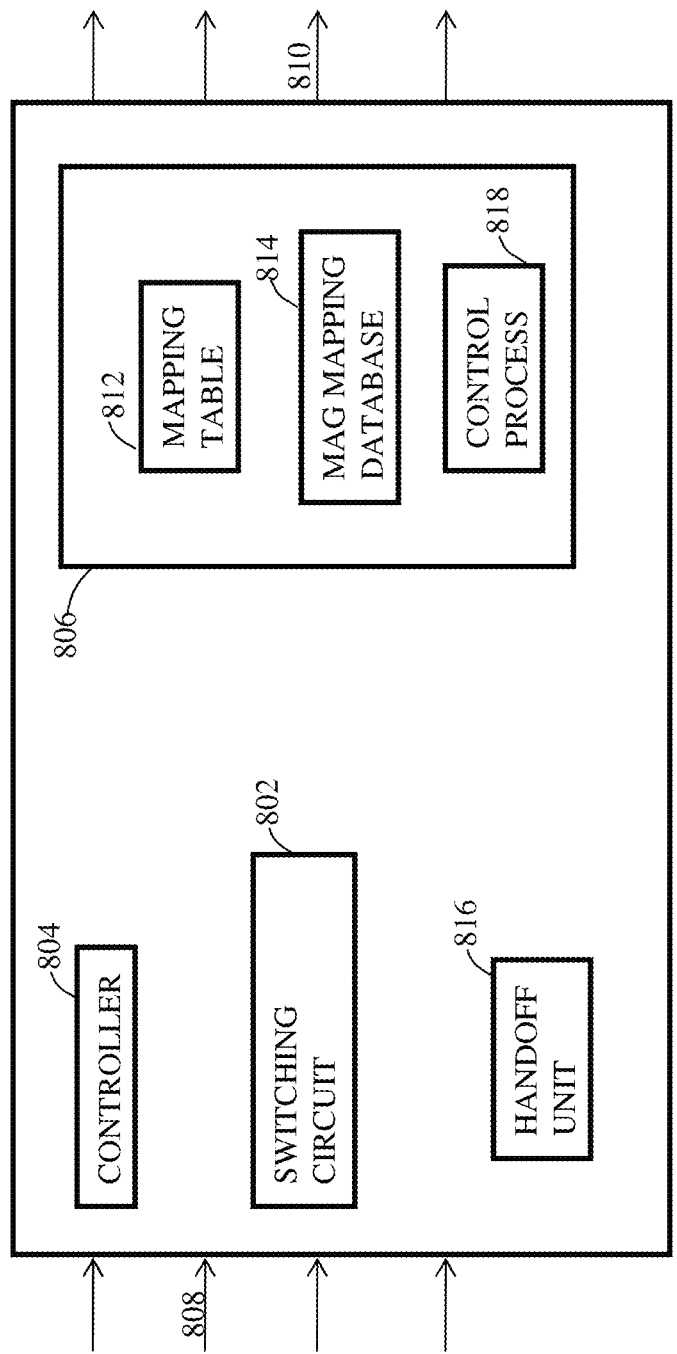
FIG. 8 illustrates a hardware device incorporating embodiments of the invention.

FIG. 8 illustrates a hardware device incorporating embodiments of the invention. The hardware device may be an ingress router and/or egress router such as a router 800.

The router 800 includes switching circuit 802, a controller 804, and a memory 806, coupled together as illustrated. Multiple input ports 808 transfer data into router 800 and multiple output ports 810 transfer data out of the router 800. Alternatively, some ports 808 or 810 may be both input and output ports. The mapping of input port to output port is performed by switching circuit 802 under the control of the controller 804. The switching circuit may be implemented as a specially designed hardware or part of an integrated processor.

Memory 806 may include a mapping table 812 such as the mapping of the egress routers for all the destination nodes that are currently being served by the (ingress) router 800, a MAG mapping database 814, which includes the mapping database for all the MAGs that are within the AS network of the (egress) router 800. For example, the mapping information obtained from a LMA/HA mapping database may be stored in the mapping database 812 of the memory 806. The mapping database may be updated after receiving a request from a new egress router (example as described in STEP 2b of FIG. 5) if the router 800 is the ingress router. Similarly, during handoff, the mapping database 812 may be updated, after receiving an update request according to STEPS 1 or 2a & 2c. If the router 800 is the new egress router, the update of STEP 1 is performed on the mapping database 812. Alternatively, if the router 800 is the previous egress router, the update of STEPS 2a and 2c are performed. Memory 806 may also store the labels used by router 800 in transferring data from input to output ports.

The instructions (handoff unit 816) for performing any of the steps in FIG. 5 may be implemented as a software program(s) run by the hardware device of FIG. 8. The software program may comprise a plurality of instructions to be executed by a processor, such as the controller 804. The software program may be stored on a non-volatile memory and copied into memory 806 as control process 818, which may then be accessed and executed by the controller 804. It is to be appreciated that the software program for the handoff unit 816 may be implemented in any of a wide variety of programming languages. In alternate embodiments, the handoff unit 816 may be implemented in discrete hardware or firmware such as a digital signal processor. Alternatively, an application specific integrated circuit (ASIC) could be programmed with the functions of the present invention. Further, these functionalities may be divided into separate and distinct routers if the egress and ingress routers for an AS network are separate routers.

In various embodiments, the present invention enhances the slow mobility capability of a core-AS separation technology while requiring minimal hardware upgrade. Embodiments of the invention provide solutions customized to the particular core-AS separation technology. Embodiments of the invention may use different means known to one skilled in the art to modify the IP headers in the PER for enabling fast mobility.

In another embodiment of this invention, the sequence of mapping changes and the handoff itself are optimized against packet loss. For example, during handoff, the PER may be dropped before the NER is established, as may be the case of a single-interface handoff. In such cases, an enhancement can be made for the PER to be notified. The PER is directed to buffer the incoming packets even though the destination node disconnects from the PER. This enables the PER to forward these buffered packets to the NER after it learns the new IP(D)-to-IP(NER) mapping information.

The network architecture described in embodiments of this invention is analogous to the core-edge separation network running Location ID Separation Protocol (LISP). This invention borrows similar terminology to describe core-edge separation by the use of different IP addresses in the core network and the edge network with ingress router and egress router separating between them. In various embodiments, this separation between core and edge may not always be well-defined.

Various embodiments of the invention thereby teach a method to achieve mobility management and handoff (fast mobility) using a generic core-AS separation technology.

Embodiments of the invention include a method to achieve mobility management and handoff across two Autonomous Systems (AS) networks of the same or different technologies using a generic core-AS separation technology. In one embodiment, the handoff is a heterogeneous handoff when the networks are of different technologies.

Embodiments of the invention also include a method to achieve fast mobility in a handoff from a previous egress router to a new egress router by selectively and therefore rapidly pushing the new mapping information of the PI address of the destination node. In one or more embodiments, fast mobility is achieved by selectively pushing new mapping to the new egress router to the communicating ingress routers and the previous egress router.

Embodiments of the invention also redirect packet from a previous egress router to a new egress router by replacing the outer IP packet header to show the IP address of the new egress router using map-and-encap technology or IP header translation/replacement technology.

In one or more embodiments, packets from previous egress router are redirected to a new egress router to accomplish handoff instead of dropping the packets if the previous egress router is no longer serving the destination address.

In one or more embodiments, a method for wireless communication includes sending a packet from an ingress router through a transit core network to a first egress router. The transit core network uses a provider assigned or aggregatable (PA) addresses to route the packet to a first egress router. The ingress router designs the packet to reach a mobile node having a provider independent (PI) address. The mobile node is supported by the first egress router. The method further includes redirecting the packet from the first egress router to a second egress router. The first egress router redirects the packet when the mobile node moves into a region supported by the second egress router. In one embodiment, the method further includes sending an update message to all ingress routers actively sending packets to the mobile node.

In various embodiments, a method for wireless communication includes at a first egress router, receiving a packet sent from an ingress router through a transit core network. The transit core network uses provider assigned or aggregatable (PA) addresses to route the packet to the first egress router. The packet is designed by the ingress router to reach a mobile node having a provider independent (PI) address. The mobile node is supported by the first egress router. The method further includes at the first egress router, redirecting the received packet to a second egress router. The first egress router redirects the packet when the mobile node moves into a region supported by the second egress router.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

Accordingly, the appended claims are intended to include within their scope such processes, machines, manufacture, compositions of matter, means, methods, or steps.

What is claimed is:

1. A method for wireless communication, the method comprising:
 at a first egress router, receiving a packet destined to a destination node, the destination node being supported by a second egress router, wherein a destination address of the packet is the first egress router; and
 at the first egress router, redirecting the packet to the second egress router, wherein the first egress router and the second egress router comprise edge routers, wherein each of the edge routers provides a contact point between a core network using border gateway protocol and autonomous systems networks using interior gateway protocol, and wherein redirecting the packet comprises:
 receiving a mapping update at the first egress router, the mapping update deleting a mapping between an IP address of the destination node and an IP address of the first egress router and adding a mapping between the IP address of the destination node and an IP address of the second egress router;
 adding a mapping between an IP address of the destination node and an IP address of the second egress router at the second egress router;
 directing an ingress router sending the packet to the destination node to delete a mapping between the IP address of the destination node and an IP address of the first egress router at the ingress router;
 directing an ingress router sending the packet to the destination node to add a mapping between the IP address of the destination node and an IP address of the second egress router at the ingress router;
 removing and replacing an IP header of the packet according to the mapping update to include the IP address of the second egress router; and
 sending the packet to the second egress router.

2. The method of claim 1, wherein redirecting the packet comprises changing the destination address of the packet by replacing an outer IP packet header of the packet with a provider assigned address of the second egress router using a map-and-encap technology.

3. The method of claim 1, wherein redirecting the packet comprises changing the destination address of the packet by replacing an IP packet header of the packet with a provider assigned address of the second egress router using an IP header translation/replacement technology.

4. The method of claim 1, wherein redirecting the packet comprises:
 buffering the packet destined to a destination node at the first egress router.

5. The method of claim 1, wherein the first and the second egress routers are served by networks having different edge-core separation technologies.

6. The method of claim 1, wherein redirecting the received packet is part of a handoff process, wherein the destination node is supported by the second egress router after the handoff process, and wherein the destination node is supported by the first egress router before the handoff process.

7. The method of claim 6, wherein after the handoff process, the first egress router is provided with an IP address of the second egress router, and wherein redirecting the packet comprises replacing an IP address of the first egress router with the IP address of the second egress router in an IP header of the packet.

8. The method of claim 1, further comprising directing an ingress router routing packets destined to the destination node to route packets to the second egress router, wherein the ingress router routes packets destined to the destination node to the first egress router before the directing.

9. The method of claim 8, wherein directing the ingress router comprises adding a mapping between the IP address of the destination node and an IP address of the second egress router at the ingress router.

10. The method of claim 1, further comprising sending a mapping update to all ingress routers actively sending packets to the destination node.

11. The method of claim 1, further comprising:
 updating a central mapping database, wherein the updating comprises adding a mapping between an IP address of the destination node and an IP address of the second egress router, and deleting a mapping between the IP address of the destination node and an IP address of the first egress router; and
 routing packets destined to the destination node to the second egress router using the updated central mapping database.

12. The method of claim 11, wherein the central mapping database is a local mobility anchor/home agent mapping database.

13. The method of claim 1, further comprising:
 updating a central mapping database, wherein the updating comprises adding a mapping between an IP address of the destination node and an IP address of the second egress router, and deleting a mapping between the IP address of the destination node and an IP address of the first egress router.

14. A method for wireless communication, the method comprising:
 supporting slow mobility of a destination node being supported by a first egress router to being supported by a second egress router by sending a request to a central mapping database to:
 delete a mapping, at the central mapping database, between an IP address of the destination node and an IP address of the first egress router, and
 add a mapping, at the central mapping database, between the IP address of the destination node and an IP address of a second egress router, wherein the central mapping database is separate and remote from the first and second egress routers; and
 supporting fast mobility of the destination node being supported by the first egress router to being supported by the second egress router by:
 sending a request to the first egress router to delete a mapping between the IP address of the destination node and the IP address of the first egress router and add a mapping between the IP address of the destination node and the IP address of the second egress router,
 adding a mapping between the IP address of the destination node and the IP address of the second egress router at the second egress router, and
 sending a request to an ingress router configured to route a packet destined to the destination node to the first egress router to delete a mapping between the IP address of the destination node and the IP address of the first egress router and add a mapping between the IP address of the destination node and the IP address of the second egress router,
 wherein the first egress router and the second egress router comprise edge routers, and wherein each of the edge routers provides a contact point between a core network using border gateway protocol and autonomous systems networks using interior gateway protocol.

15. The method of claim 14, wherein the central mapping database is a local mobility anchor/home agent mapping database.

16. The method of claim 14, wherein routing a second packet destined to the destination node to the second egress router comprises replacing an outer IP packet header of the packet with a provider assigned (PA) address of the second egress router using a map-and-encap technology.

17. The method of claim 14, wherein routing a second packet destined to the destination node to the second egress router comprises replacing an IP packet header of the packet with a provider assigned (PA) address of the second egress router using an IP header translation/replacement technology.

18. A method for wireless communication, the method comprising:
at an ingress router, adding a first mapping between an IP address of a destination node and an IP address of a first egress router;
at the ingress router, routing a first packet from a source node destined to the destination node to the first egress router, wherein the ingress router comprises an edge router providing a contact point between a core network using border gateway protocol and an autonomous systems network comprising the source node;
at the ingress router, routing a second packet destined to the destination node to the first egress router, wherein routing the second packet is performed after the destination node changes from being served by the first egress router to a second egress router such that the destination node is not being served by the first egress router, and wherein the second packet is rerouted from the first egress router to the second egress router;
after routing the second packet, deleting the first mapping between the IP address of the destination node and the IP address of the first egress router, and adding a second mapping between the IP address of the destination node and an IP address of the second egress router;
at the ingress router, routing a third packet destined to the destination node to the second egress router, wherein the first egress router and the second egress router provide contact points between the core network and other autonomous systems networks using interior gateway protocol, and wherein routing the third packet is performed after the destination node changes from being served by the first egress router to the second egress router; and
sending a query comprising the IP address of the destination node to a central database, and receiving the IP address of the first egress router before adding the first mapping between the IP address of the destination node and the IP address of the first egress router.

19. The method of claim 18, wherein routing the second packet comprises adding the second mapping between the IP address of the destination node and the IP address of the second egress router at the ingress router.

20. The method of claim 18, wherein the IP address of the destination node is a provider independent IP address, and wherein the IP address of the second egress router is a provider assigned IP address.

21. The method of claim 18, further comprising sending a mapping update to all ingress routers actively sending packets to the destination node.

22. The method of claim 18, wherein routing the second packet comprises replacing an outer IP packet header of the packet with a provider assigned (PA) address of the second egress router using a map-and-encap technology or translation/replacement technology.

23. An egress router comprising:
a receiver configured to receive a packet destined to a destination node, the destination node being supported by another egress router, wherein a destination address of the packet is the egress router, and wherein the receiver is configured to provide a contact point between a core network using border gateway protocol and an autonomous systems network using interior gateway protocol;
a mapping database configured to receive a mapping update, the mapping update deleting a mapping between an IP address of the destination node and an IP address of the egress router and adding a mapping between the IP address of the destination node and an IP address of the another egress router; and
a controller configured to
redirect the packet to the another egress router and update the mapping database according to the mapping update,
add a mapping between an IP address of the destination node and an IP address of the another egress router at the another egress router,
direct an ingress router sending the packet to the destination node to delete a mapping between the IP address of the destination node and an IP address of the egress router at the ingress router,
direct an ingress router sending the packet to the destination node to add a mapping between the IP address of the destination node and an IP address of the another egress router at the ingress router,
remove and replace an IP header of the packet according to the mapping update to include the IP address of the another egress router, and
send the packet to the another egress router.

24. The egress router of claim 23, wherein the controller is configured to change the destination address of the packet by replacing an outer IP packet header of the packet with a provider assigned address of the another egress router using a map-and-encap technology.

25. The egress router of claim 23, wherein the controller is configured to change the destination address of the packet by replacing an IP packet header of the packet with a provider assigned address of the another egress router using an IP header translation/replacement technology.

26. The egress router of claim 23, further comprising:
a buffer configured to buffer the packet destined to a destination node at the egress router.

* * * * *